M. LACHMAN.
METAL WHEEL.
APPLICATION FILED APR. 30, 1921.
1,403,121.
Patented Jan. 10, 1922.
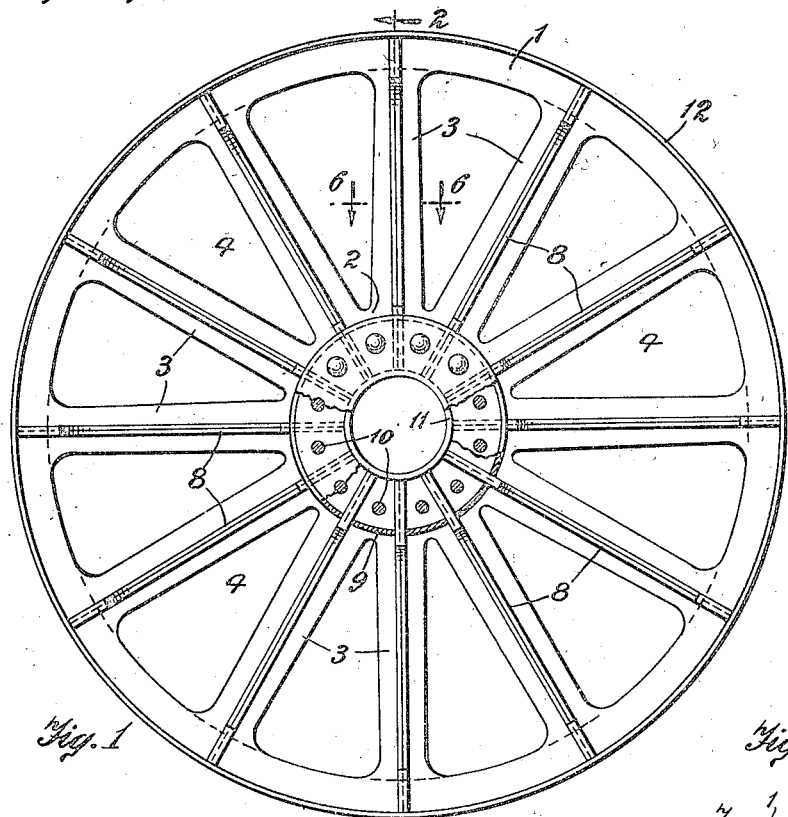
Fig. 1
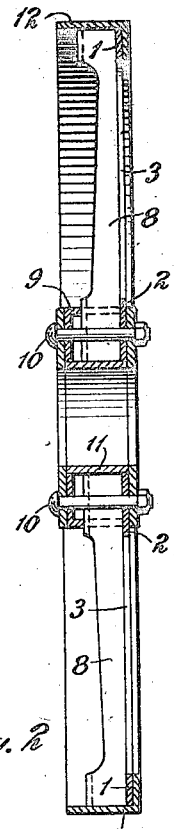
Fig. 2
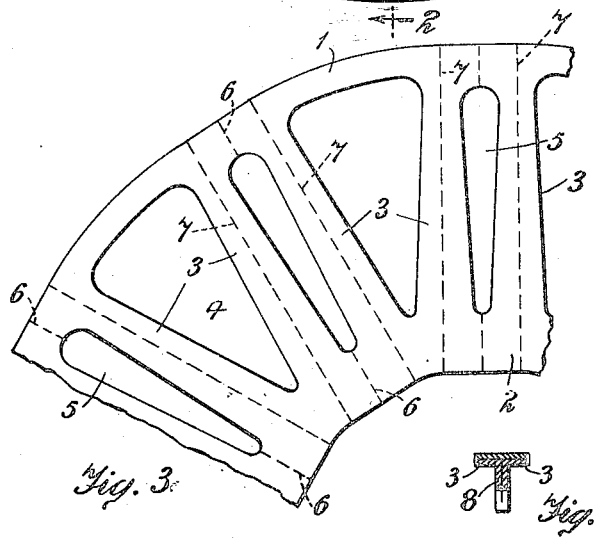
Fig. 3
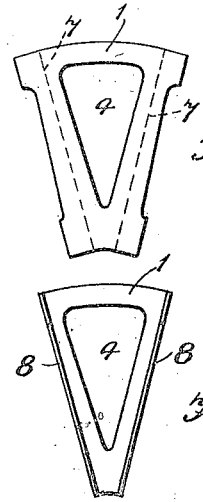
Fig. 4
Fig. 5
Fig. 6
Inventor
MAURICE LACHMAN
By his Attorneys
Townsend & Decke

UNITED STATES PATENT OFFICE.

MAURICE LACHMAN, OF NEW YORK, N. Y., ASSIGNOR TO BETHLEHEM STEEL COMPANY, OF BETHLEHEM, PENNSYLVANIA, A CORPORATION OF PENNSYLVANIA.

METAL WHEEL.

1,403,121.

Specification of Letters Patent. Patented Jan. 10, 1922.

Application filed April 30, 1921. Serial No. 465,670.

*To all whom it may concern:*

Be it known that I, MAURICE LACHMAN, a citizen of the United States, and a resident of New York, in the county of New York and State of New York, have invented certain new and useful Improvements in Metal Wheels, of which the following is a specification.

My invention relates to the construction of metal wheels and more particularly to that class of wheels in which the spoke, hub and rim parts are integral with one another, being formed of a single plate or sheet of metal.

The object of my invention is to produce a wheel of this general character which shall have a reinforcement provided by ribs disposed to one side of the disk and extending radially and which shall be, furthermore, integral with said disk or plate, the effect being to make a wheel of the general form indicated, that is to say, one in which the rim, hub and spoke parts shall consist of a single disk of metal but which shall be further reinforced by strengthening radial ribs, all of said parts being integral.

To these ends my invention consists in the construction of wheel hereinafter more particularly described and also in the details of construction embodying the features indicated above as the main features of my invention.

Referring to the drawings:

Fig. 1 is a side elevation of a wheel embodying my invention.

Fig. 2 is a vertical section on the line 2—2 Fig. 1.

Fig. 3 shows a portion of a blank as formed preliminary to the shaping of it into the form of the finished structure of hub, rim and spokes.

Fig. 4 shows a blank which I employ when the wheel is built up from a number of sectors each consisting of hub, rim and spoke parts integrally embodying a plate or sheet.

Fig. 5 shows the sector of Fig. 4 as formed up for use in the wheel.

Fig. 6 is a section on line 6—6 of Fig. 1.

Referring to the drawings:

1 indicates the rim part, 2 the hub part and 3 the spoke part of a sheet metal plate or disk of which the wheel is composed. Said rim and hub parts may be circumferentially continuous or the rim part mentioned may form merely an arc of the wheel and a number of said arcs at rim and hub be assembled to complete the circumference.

In the preferred form of my invention, however, the rim is circumferentially integral throughout, as likewise the hub part. In the preferred form of my invention the plate or disk is cut out to provide spaces 4 as indicated in Figs. 3 and 1, so that the complete wheel will have the appearance of an ordinary spoked wheel. As shown in Fig. 3, the blank on lines coinciding with the center of the spokes is cut out, as indicated at 5, for the purpose of lightening the construction and providing a rib tapering from the hub to the rim, as shown in Fig. 2, although this is not necessary to the invention.

The blank having been cut as indicated in Fig. 3, is folded or bent on the radial lines 6—6 and 7—7 so as to fold up the two portions to either side of the line 6—6 and embraced between it and the lines 7—7 to either side thereof into the rib 8, which, as will be seen, occupies the position and performs the function of a reinforcing rib for the two portions of the plate brought together on the lines 7—7 to form the face of a spoke 3, the plane of the rib being disposed transversely to the plane of the wheel and of the main portion of the plate comprising the spoke, rim and hub portions. As will be seen, said rib extends to the outer edge of the rim part 1 and to the inner edge of the hub part and is of double the thickness of the main portion of the plate, thereby securing great strength and permitting the spoke part of the rib to be tapered, as indicated in Fig. 2, from the hub towards the rim.

At the hub the bent up part or parts of the plate formed to act as a strengthening rib may be received and spaced apart from the other portions of the wheel in slots in the hub shell 9 and the whole clamped between hub flanges by means of the bolts 10 in obvious fashion. The hub shell, as shown, may consist of the horizontal part slotted from one edge and the vertical part which is embraced or engaged by one of the hub flanges and rests upon the hub barrel 11.

In the modification of my invention illustrated in Figs. 4 and 5, sector-shaped metal plates may be used each having rim, hub and spoke part all integral with one another and each sector-shaped plate may be bent up on the lines 7—7 to form a radially extending flange 8 disposed transversely to the general plane of the plate. Said sectors being assembled and built up to form the complete wheel, the flanges 8 of contiguous sectors will lie against one another and will form in effect strengthening ribs of double thickness. Said flanges of the contiguous plates may be fastened together, if desired, by spot welding or otherwise. In this form of my invention folding or bending on the lines 6—6 is dispensed with.

12 indicates the outer rim which has preferably the inwardly turned flange as indicated and which receives and which may be secured to the rim part 1 in any desired way.

What I claim as my invention is:—

1. A metal wheel having a rim, hub and spoke part integral and consisting of a plate or sheet of metal provided with radial strengthening ribs integral with the plate and formed of a portion thereof bent transversely to the plane of said plate, said ribs extending through the spoke parts into the rim and hub parts.

2. A metal wheel having rim and hub parts both circumferentially continuous and integral with the spoke parts, all formed of a single plate or sheet of metal bent or folded in a radial line of the spokes to afford radial reinforcing ribs extending continuously through the spoke parts and the rim parts to the edge of the plate, the plane of each rib disposed transversely to the plane of the wheel.

3. A metal wheel having a continuous rim, a continuous hub and individual spokes integral with one another and consisting of a single plate or sheet of metal, said individual spokes having strengthening ribs consisting of a folded portion of the sheet metal plate folded in a radial line.

4. In a metal wheel embodying a metal plate constituting a rim part, a hub part and a spoke part of the wheel and provided with a strengthening rib integral with the plate and formed of a bent portion thereof bent transversely to the plane of the plate and the plane of the wheel and extending radially from the inner edge of the hub part to the outer edge of the rim part of said plate.

5. A metal wheel embodying a metal plate constituting a rim part, a hub part and a spoke part of the wheel and provided with a strengthening rib integral with the plate and formed of a bent portion thereof bent transversely to the plane of the plate and the plane of the wheel and embracing the hub, rim and spoke portions of said plate.

6. A metal wheel having spoke parts integral with rim and hub parts and all formed of a sheet metal plate, said spoke parts having radially extending reinforcements formed of a double thickness of the sheet metal and integral with the plate.

7. A metal wheel having a circumferentially continuous rim and hub part and a spoke part all integral with one another and consisting of a single plate of metal, said wheel having radial strengthening ribs also integral with the plate.

8. A metal wheel having a spoke part integral with circumferentially continuous rim and hub parts all formed from a sheet metal plate and provided with radial reinforcements formed of a double thickness of the sheet metal and integral with the plate.

Signed at New York, in the county of New York and State of New York, this 28th day of April, A. D. 1921.

MAURICE LACHMAN.